Jan. 31, 1950  W. T. DONAHUE  2,496,122
GRAINED LAMINATED STRUCTURE
Filed March 8, 1946
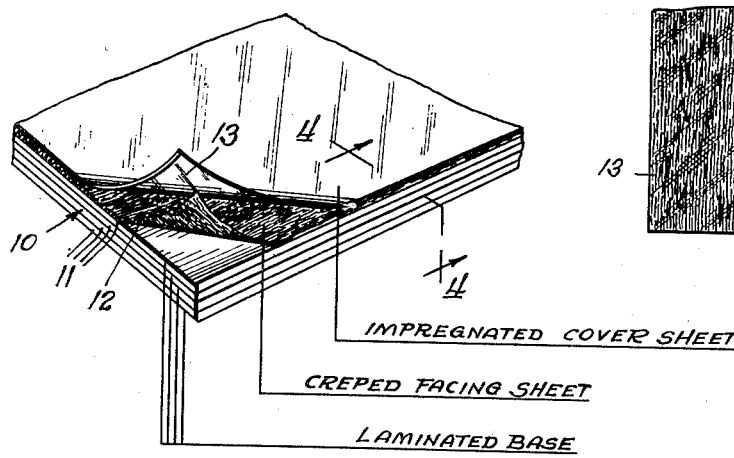
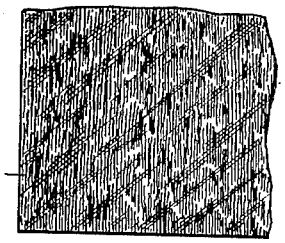
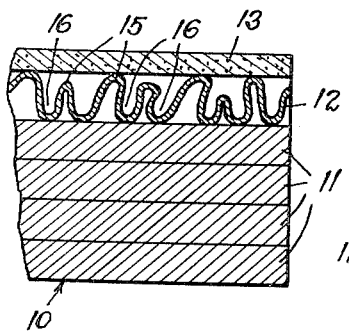
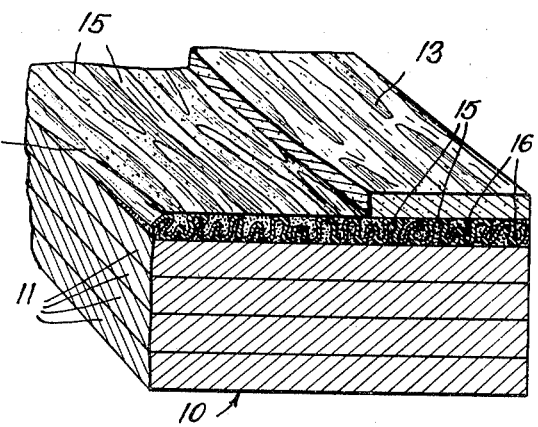
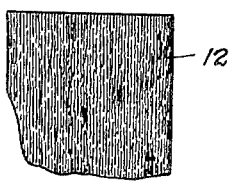
Inventor:
William T. Donahue.
By Brown, Jackson, Boettcher & Dienner. Attys.

Patented Jan. 31, 1950

2,496,122

UNITED STATES PATENT OFFICE 2,496,122

GRAINED LAMINATED STRUCTURE

William T. Donahue, Chicago, Ill.

Application March 8, 1946, Serial No. 653,100

1 Claim. (Cl. 154—45.9)

This invention relates to laminated structures and has to do with laminated structures having grained surfaces simulating natural wood, and with the method of producing laminated structures.

Laminated structures formed of sheets or layers of suitable materials united by synthetic resin or other binders are known and extensively used. In many of such structures, the laminations or sheets are formed of paper, fabric or other fibrous materials impregnated with a thermosetting synthetic resin and are united under heat and pressure, to provide a comparatively hard and dense product of considerable mechanical strength. Laminated structures of this type are extensively used for table tops, counters and numerous other purposes. Such structures produced in the ordinary manner, have a high gloss and uniform finish with no grain and, while highly efficient for many purposes, are not suitable for use where a wood finish is necessary or desirable.

Various attempts have been made to produce laminated structures of the character referred to having a surface simulating natural wood. It has been proposed to provide, in such structures, a top or facing sheet of paper having printed on its exposed surface a reproduction of the grain of natural wood. The cost of such paper is rather high, particularly if the grain effect of wood is to be closely simulated or accurately reproduced, which in many instances renders the cost of the finished product excessive with respect to the prospective market. Further, even if the wood grain effect be printed with care and accuracy on the paper, the printed grain lacks the depth of the grain of natural wood, from which the paper with the printed grain thereon can easily be distinguished by a person familiar with the various woods and wood finishes. It has also been proposed to provide laminated structures of the character referred to with grained finishes by placing on the base or body portion of the structure a finishing sheet of veneer of the desired natural wood, there being a transparent cover sheet placed over the veneer finishing or facing sheet, the two sheets and the base being bonded together. That provides a laminated structure having the desired natural wood finish, and the finish on such a structure can readily be distinguished from a structure having a facing sheet of paper printed on its exposed surface to simulate natural wood. While the laminated structure having the natural wood veneer facing sheet is of attractive and striking appearance, it is rather costly, particularly where rare wood veneer is used, and the cost of production of such structures restricts the possible market therefor. Further, in laminated structures using wood veneer facing sheets, the colors are limited to the colors of the natural wood, as usually finished, unless the veneer be specially colored, which entails further expense.

My invention is directed to the production of laminated structures, of the general character above referred to, having grained surfaces closely simulating the grain of natural wood, which may be produced at but little, if any, greater cost than such structures having ungrained surfaces, and which may have a finish of any desired color without any increase in expense. More specifically, I provide a facing sheet so formed as to have a grain like surface comprising closely adjacent ridges with depression therebetween together closely simulating the grain of natural wood and providing, in fact, a grain structure of appreciable depth analogous to the grain structure of natural wood. In constructing a laminated structure embodying my invention, I place a facing sheet of the character stated on a suitable base, preferably with a transparent covering sheet on top of the facing sheet, and bond the base and the facing sheet, and the covering sheet, when used, together by means of a suitable binder, preferably a synthetic resin. Preferably, the binder used is a substantially transparent synthetic resin which substantially fills the depressions of the facing sheet and, together with the cover sheet, when used, augments the apparent depth of the grain of the facing sheet. Further objects and advantages of my invention will appear from the detailed description.

In the drawings:

Figure 1 is a fragmentary isometric view of a body or base portion and the facing and the covering sheets, with the latter turned back at one corner, in assembled relation for producing a grained laminated structure embodying my invention;

Figures 2 is a fragmentary face view of the structure produced from the assembly of Figure 1, after the various elements thereof have been bonded together to provide a unitary structure;

Figure 3 is a fragmentary face view of a facing sheet of creped material used for giving the desired grain finish to the composite product;

Figure 4 is a sectional view taken substantially on line 4—4 of Figure 1, on an enlarged scale; and Figure 5 is a fragmentary sectional view through the finished product embodying my invention, on an enlarged scale, with the covering sheet partly broken away.

In constructing a laminated product in accordance with my invention, I provide a body or base element to which is bonded a facing sheet of a suitable material, which facing sheet has been so treated as to have a grain structure of appreciable depth, there being a substantially transparent cover sheet disposed over the face sheet and bonded thereto. The bonding material or resin used is transparent and substantially fills the depressions of the facing sheet, augmenting the apparent depth of the grain structure thereof. The base element may be formed of a plurality of laminations of any suitable material, including both natural and artificial fibrous materials as well as any known materials suitable for that purpose, impregnated with a suitable binder by which the laminations are united. The facing sheet may likewise be formed of any suitable material, as may the cover sheet. The binder for securing the elements of the structure together may be of any suitable type, though preferably I use one of the synthetic resins and the resin used may be a thermosetting resin, a thermoplastic resin or a contact resin. Suitable thermosetting resins include phenol formaldehyde, urea formaldehyde, melamine, and analogous resins. Suitable thermoplastic resins include ethyl cellulose, cellulose acetate, and the like. Contact resins which may be used for the purposes of my invention include derivatives of allyl alcohol, polyester resins and similar contact resins. If desired, the body or base element of the laminated structure, instead of being laminated may be formed of a single thickness of suitable material such as, for example, a relatively inexpensive wood to which the facing sheet and the cover sheet may be bonded to give a grain finish simulating a relatively expensive or rare wood.

For purposes of description, it may be assumed that the body or base element of the laminated structure is formed of a plurality of layers or laminations of fabric, impregnated with a thermosetting resin, such as urea formaldehyde, the facing sheet is formed of paper and the cover sheet is likewise formed of paper, the latter being impregnated with a thermosetting resin, which may be the same as that used in the base element or different therefrom. The resin used in the cover sheet is of such character that it is transparent, or substantially so, when set. In the following description it is to be understood that the above assumption is by way of example only and that the materials used may vary within rather wide limits, as above explained.

Referring now to the drawings, in Figure 1 I have shown a base element 10 comprising a plurality of sheets or laminations 11, formed of a suitable cloth or fabric and impregnated with a thermosetting synthetic resin, such as urea formaldehyde, the laminations 11 being, of course, stacked one upon the other. A facing sheet 12, formed of crepe paper, is laid upon the upper face of base element 10, and a cover sheet 13, also formed of paper, is placed upon the upper face of facing sheet 12. The cover sheet is impregnated with a thermosetting resin of a character to render the cover sheet transparent, or substantially so, and to be transparent, when the assembled sheets and laminations have been united to produce the desired structure.

The facing sheet 12 is formed of paper, as above noted, preferably being formed of a good grade of tissue paper and is creped, whereby this sheet is provided throughout the area thereof with closely adjacent relatively narrow ridges 15 with depressions 16 between the ridges, as shown more clearly in Figures 4 and 5, in which the various elements of the assembly and of the finished product have been shown on a greatly enlarged scale, as will be understood. The assembled stack of sheets or laminations is subjected to heat and pressure, and is thereby consolidated to provide a unitary structure the elements of which are bonded together by the resin, the latter hardening in setting, so that the final product is rather hard and rigid, possesses considerable mechanical strength and has a high finish. The applied pressure produces local high and low spots or areas of the creped paper sheet 12, which augments the grain effect thereof. Further, the resin from the cover sheet 13 flows, when the assembly is subjected to heat and pressure, into the depressions of facing sheet 12 and substantially fills such depressions, as shown in Figure 5. This resin is of such character that it is transparent or substantially so, when set, and the cover sheet 13 is also transparent or substantially so, this sheet 13 and the resin in the depressions of sheets 12 together augmenting the apparent depth of the grain structure of the latter sheet. In that connection, the creping of sheet 12 provides that sheet with a structure which is analogous to the grain structure of natural wood, in that sheet 12 has numerous closely adjacent ridges of appreciable height with depressions therebetween of appreciable depth.

The finishing or facing sheet 12 may be cut from commercial creped paper, which is produced in large volume and in numerous colors and shades. This crepe paper is available at prices comparable to the cost of paper or fabrics ordinarily used for the laminations of structures of the type with which my invention is concerned. Accordingly, laminated products or structures may be produced in accordance with my invention without any increase in cost over present day structures of the same character without a grain finish, which renders the grained structure of my invention available for the same market as the present day ungrained laminated products. By using a brown creped paper for the facing sheet 12, it is possible to produce a finished product closely simulating, at the grained surface thereof, black walnut. If a reddish brown creped paper facing sheet is used, the product will have a finish closely resembling mahogany. By using a black creped facing sheet, a finish closely resembling ebony may be produced. On the other hand, by inserting a finishing sheet of any desired color other than that of natural wood, a grained finish closely simulating stained natural wood can be produced. Since, as noted, the creped paper is available in large quantity and at prices comparable to the prices of material ordinarily used in producing ungrained laminated structures of the character referred to, a great variety of attractive grained effects may be produced without increase in cost compared to the cost of ungrained laminated structures. Further, since the crepe paper is readily stretchable in various directions, it is practicable to apply, in accordance with my invention, a grained finish to three dimensional articles and to articles having rounded surfaces, it being understood that my invention is not limited to flat surfaces only, though so illustrated by way of example.

In the illustrated embodiment of my invention I have shown the facing sheet 12 as being formed of creped paper in which the creping or ridges 15 and depression 16 extend in more or less parallel relation, giving the effect of close grained wood. There are various ways in which paper is creped and it is to be understood that the particular manner of creping of the paper for the facing sheet may be varied depending upon the desired result. Obviously, the grain finish of my invention may be applied to one or more surfaces of the composite product, as desired. Likewise, instead of having a continuous finishing or facing sheet 12, the facing element, or elements, of the composite structure may be cut to produce a border effect, an inlay effect, and numerous other designs of unusual and attractive appearance. While I have shown but one cover sheet 13, two or more cover sheets may be used, increased thickness of the cover element of the finished product tending to increase the apparent depth of the grain like structure of the facing element or elements, which may be desirable in certain cases. On the other hand, my invention contemplates omitting the cover sheet, in which case the facing element or elements may be initially impregnated with a thermosetting synthetic resin, or other suitable binder, and bonded to the body portion or base element of the structure. If desired, the cover sheet 13 may be quite thin so that in the finished composite product, the ridges of the facing sheet produce minute projections, detectable by moving the ends of the fingers over the surface of the finished product, giving much the same effect as passing the fingers over the surface of finished natural wood. While I prefer to complete the structure in a single operation, as above, that is not essential and, if desired, the laminated body or base element of the structure may first be completed, after which the grained facing element or elements, with the cover sheet, if used, may be bonded to the base element to produce the finished structure. That may be desirable in certain cases, as where the binder used for the facing element and cover sheet may be different from the binder used for the base element. Also, the grained facing sheet or element need not be colored and may be substantially transparent, in which case the underlying base element may be suitably colored, the overlying facing element or elements, due to the grained or creped structure thereof, producing in cooperation with the underlying base element a grained effect of attractive appearance. Further, when the base element is colored, particularly to simulate the color of finished natural wood, the facing element may be rendered substantially transparent, as by being formed of quite thin paper, so that the underlying areas of the base element are visible so as to produce a somewhat streaked appearance such as occurs in natural wood, thereby augmenting the grained effect of the finish.

As above indicated, it will be understood that changes in details may be resorted to, both as to the product and the method of my invention, and I intend to include all such variations, as fall within the scope of the appended claim, in this application in which the preferred form only of my invention has been disclosed.

I claim:

In a grained laminated structure, a laminated base comprising a plurality of sheets of fibrous material, a facing sheet of paper at one face of said base creped independently thereof and exterior thereto, and a cover sheet of fibrous material overlying said facing sheet, all of said sheets being impregnated with and bonded together by a synthetic resin binder, said cover sheet being substantially transparent and the physical structure of said creped paper simulating the grain of natural wood, said resin substantially filling the depressions of the creped paper and being substantially transparent augmenting the apparent depth of the grain like structure thereof.

WILLIAM T. DONAHUE.

REFERENCES CITED

The following references are of record in the file of this patent:

UNITED STATES PATENTS

| Number | Name | Date |
| --- | --- | --- |
| 477,120 | Housman | June 14, 1892 |
| 768,055 | Leisel | Aug. 23, 1904 |
| 1,180,516 | McIndoe | Apr. 25, 1916 |
| 1,454,845 | Clay | May 15, 1923 |
| 1,997,358 | Cochrane | Apr. 9, 1935 |
| 2,011,183 | Patterson | Aug. 13, 1935 |
| 2,031,703 | Galligan et al. | Feb. 25, 1936 |
| 2,125,076 | Mains | July 26, 1938 |
| 2,166,002 | Fritsch | July 11, 1939 |
| 2,183,426 | Hart | Dec. 12, 1939 |
| 2,276,567 | Donaldson | Mar. 17, 1942 |
| 2,295,891 | Copeman | Sept. 15, 1942 |
| 2,343,740 | Birmingham | Mar. 7, 1944 |